United States Patent [19]
Turcotte et al.

[11] Patent Number: 6,038,879
[45] Date of Patent: Mar. 21, 2000

[54] COMBINED AIR EXCHANGE AND AIR CONDITIONING UNIT

[75] Inventors: Yvon Turcotte, 1120 des Pinsons, Boucherville, Québec, Canada, J4B 6H1; Alain Coulombe, Montreal, Canada

[73] Assignee: Yvon Turcotte, Canada

[21] Appl. No.: 08/868,749

[22] Filed: Jun. 4, 1997

Related U.S. Application Data

[63] Continuation of application No. 08/512,667, Aug. 8, 1995, abandoned.

[51] Int. Cl.$^7$ ..................................................... F25B 29/00
[52] U.S. Cl. ............................... 62/325; 62/404; 62/407; 62/408; 62/409; 62/428
[58] Field of Search ............................ 62/325, 404, 407, 62/408, 409, 428

[56] References Cited

U.S. PATENT DOCUMENTS

| | | |
|---|---|---|
| 3,995,446 | 12/1976 | Eubank . |
| 4,071,080 | 1/1978 | Bridgers . |
| 4,347,712 | 9/1982 | Benton . |
| 4,655,278 | 4/1987 | Seguin . |
| 4,887,438 | 12/1989 | Meckler . |
| 5,179,998 | 1/1993 | Des Champs . |
| 5,816,066 | 10/1998 | Aoki et al. ............................... 62/325 |
| 5,901,572 | 5/1999 | Peiffer et al. ............................. 62/325 |

FOREIGN PATENT DOCUMENTS

| | | |
|---|---|---|
| 76 05225 | 2/1976 | France . |
| 61-36641 | 7/1984 | Japan . |
| 2 251 064 | 6/1992 | United Kingdom . |

*Primary Examiner*—Henry Bennett
*Assistant Examiner*—Mark Shulman
*Attorney, Agent, or Firm*—Quarles & Brady LLP

[57] ABSTRACT

The combined air exchange and air conditioning unit is used for conditioning air from a conditioned space. The unit comprises an exhaust air chamber, a return air chamber, a supply air chamber, and a fresh air chamber. A supply blower is used for drawing air from inside the supply air chamber to the outside and an exhaust blower is used for drawing air from inside the exhaust air chamber. A central plate damper is provided for regulating air transfers between the chambers. The damper plate is movable within a position range defined between two extreme positions, the first position allowing a connection of the return air chamber with the supply air chamber and a connection of the fresh air chamber with the exhaust air chamber, the second extreme position allowing a connection of the return air chamber with the exhaust air chamber and a connection of the fresh air chamber with the supply air chamber. The unit is further provided with a heat pump for reversibly transferring heat between air to be drawn by the exhaust blower means, and air to be drawn by the supply blower means. The unit combines an air exchange device and an air conditioning device in a very compact housing.

18 Claims, 4 Drawing Sheets

COMBINED AIR EXCHANGE AND AIR CONDITIONING UNIT

CROSS-REFERENCE TO RELATED APPLICATION

This is a continuation of U.S. Ser. No. 08/512,667, filed Aug. 8, 1995, now abandoned.

FIELD OF THE INVENTION

The present invention relates to a combined air exchange and air conditioning unit for conditioning air in a conditioned space.

BACKGROUND OF THE INVENTION

As the saving of energy and the comfort of occupants become increasingly important, buildings and dwellings are more often provided with air exchange devices so that the air inside the conditioned space, be replaced constantly or from time to time. For example, construction codes in some regions require that new homes and buildings be provided with such air exchange devices. These devices are connected to the ductwork of the air conditioning system or provided with an independent ductwork. The main purpose of these devices is to replace air while transferring heat between the exhaust air and the incoming fresh air. As a result, energy is saved by pre-cooling or pre-heating the incoming fresh air with the exhaust air instead of having to fully heat or cool it while the exhaust air is drawn outside in pure waste.

Installation of an air exchange device often requires air ducts, controls, space and labor costs in addition to the conventional air conditioning device.

SUMMARY OF THE INVENTION

The object of the present invention is to provide a very versatile and compact unit that suitably combines an air exchange device and an air conditioning device.

More particularly, the object of the present invention is to provide a combined air exchange and air conditioning unit for conditioning air in a conditioned space, the unit comprising:
- an exhaust air chamber having an air outlet for connection with an air exhaust location outside the conditioned space;
- an exhaust blower means for drawing air from inside the exhaust air chamber through the air outlet thereof;
- a return air chamber having an air intake for connection with at least one air return location in the conditioning space;
- a supply air chamber having an air outlet for connection with at least one air supply location in the conditioned space;
- a supply blower means for drawing air from inside the supply air chamber through the air outlet thereof;
- a fresh air chamber having an air intake for connection with a fresh air location outside the conditioned space and remote from the air exhaust location;
- a damper means for regulating air transfers between the chambers, the damper means being movable within a position range defined between a first and a second extreme position, the chambers being connected in pairs independent from one another when the damper means is in the first or second extreme position, the first extreme position allowing a connection of the return air chamber with the supply air chamber and a connection of the fresh air chamber with the exhaust air chamber, the second extreme position allowing a connection of the return air chamber with the exhaust air chamber and a connection of the fresh air chamber with the supply air chamber;
- an actuating means for moving the damper means within the position range;
- a heat pump means for reversibly transferring heat between air to be drawn by the exhaust blower means, and air to be drawn by the supply blower means, the heat pump means comprising:
  - a first heat exchanger means for exchanging heat with air to be drawn by the exhaust blower means;
  - a second heat exchanger means for exchanging heat with air to be drawn by the supply blower means;
  - a control means for controlling the actuating means and the heat pump means.

A non-restrictive description of a preferred embodiment will now be given with reference to the appended drawings.

IDENTIFICATION OF THE COMPONENTS

Figure 1:
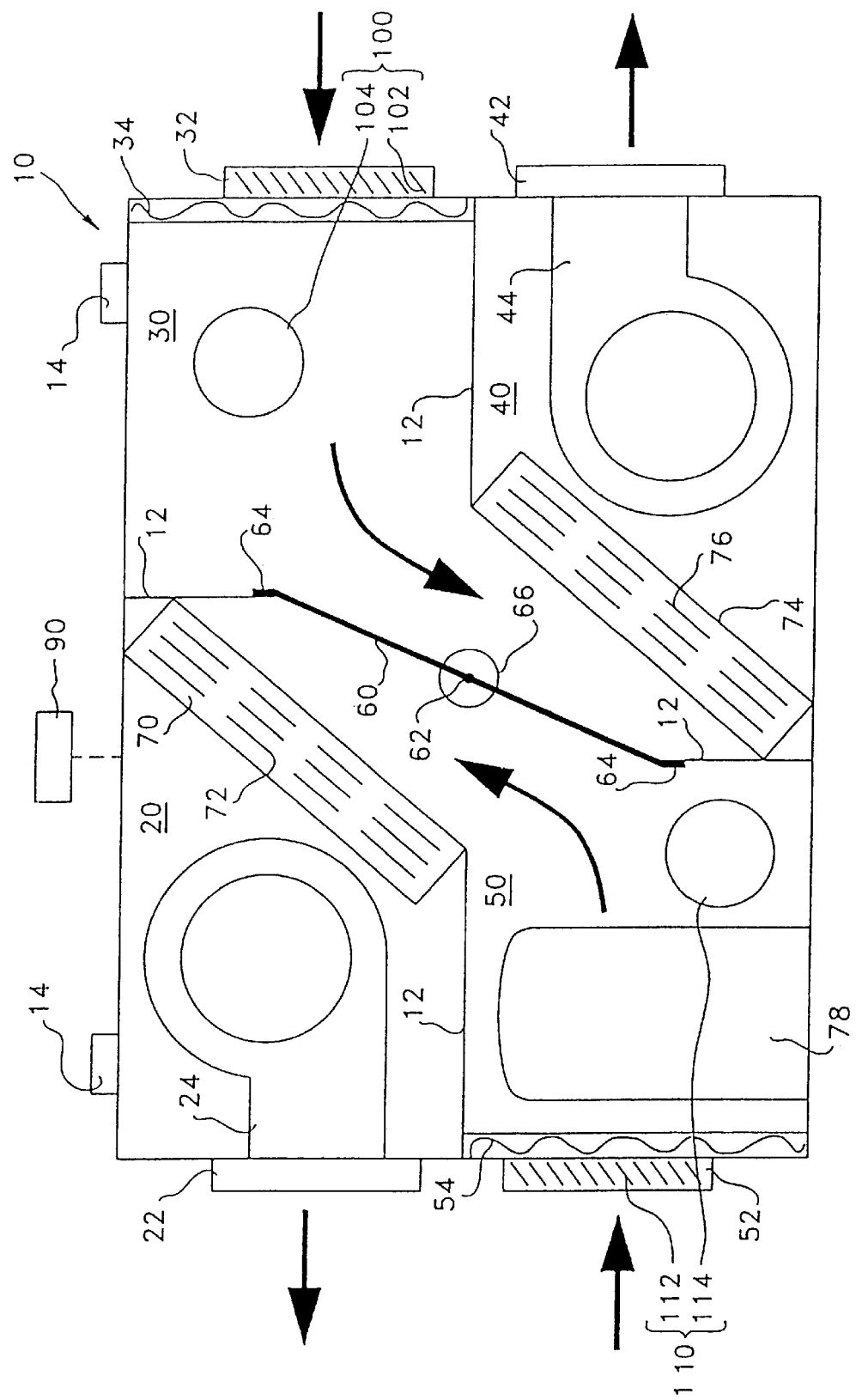
FIG. 1 is a cross-sectional view of the combined unit according to the present invention, showing the unit with no air exchange between inside and outside the conditioned space.

The following is a list of the components found in the drawings and in the description of a preferred embodiment:

10 combined unit
12 inner walls
14 connecting means
20 exhaust air chamber
22 air outlet (of exhaust air chamber)
24 exhaust blower
30 return air chamber
32 air intake (of return air chamber)
34 first air filter
40 supply air chamber
42 air outlet (of supply air chamber)
44 supply blower
50 fresh air chamber
52 air intake (of fresh air chamber)
54 second air filter
60 revolving plate
62 central axis
64 edges (of revolving plate)
66 actuating means
70 first heat exchanger
72 first refrigerant coil
74 second heat exchanger 76 second refrigerant coil
78 compressor
80 first valve means
82 expansion means
84 second valve means
86 refrigerant tubing
90 control means
100 first air bypass assembly
102 first air intake shutter means 104 first air recovery means
110 second air bypass assembly
112 second air intake shutter means 114 second air recovery means

DESCRIPTION OF A PREFERRED EMBODIMENT

Figure 2:
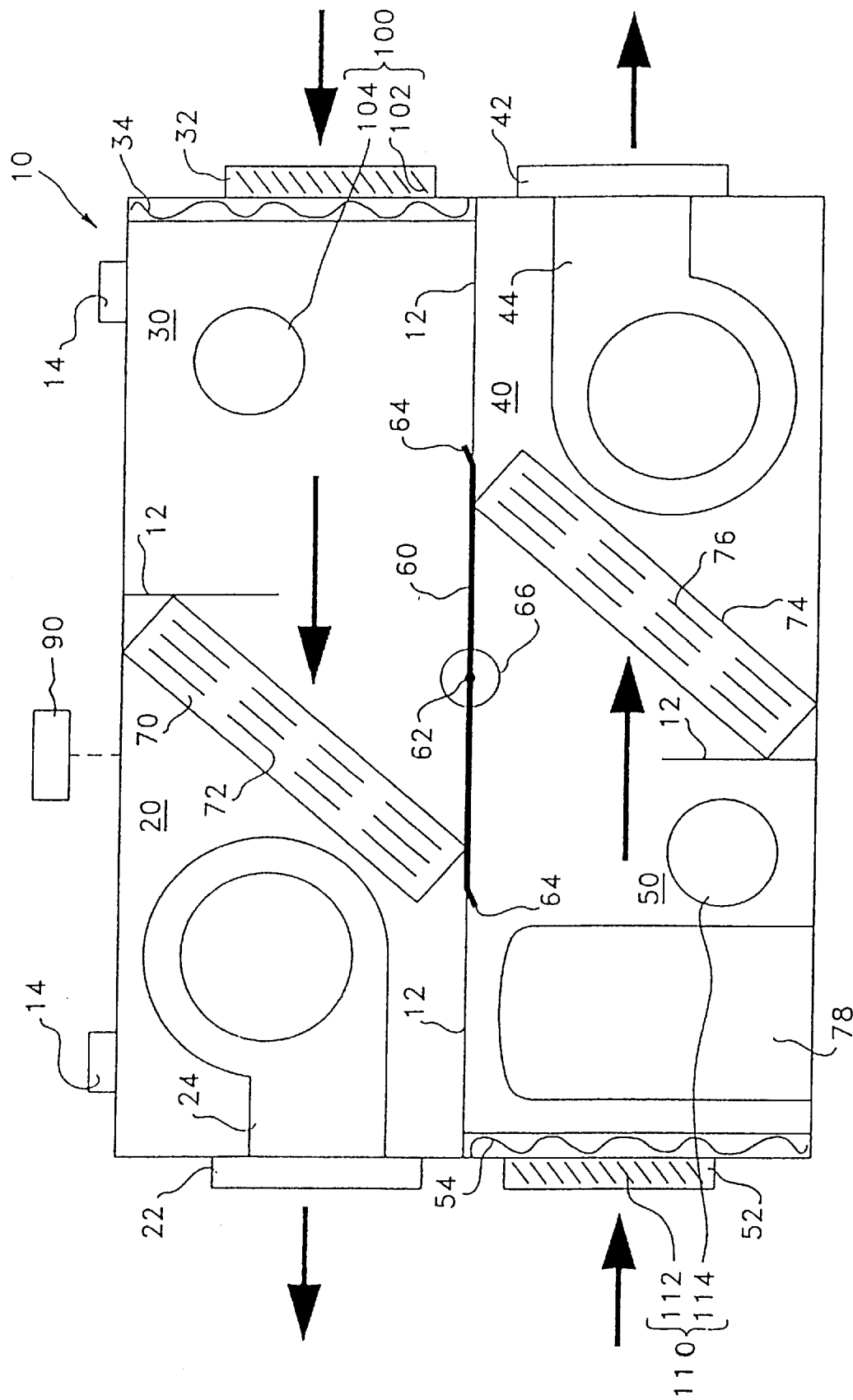
FIG. 2 is a view similar to FIG. 1, showing the unit with full air exchange between inside and outside the conditioned space.
Figure 3:
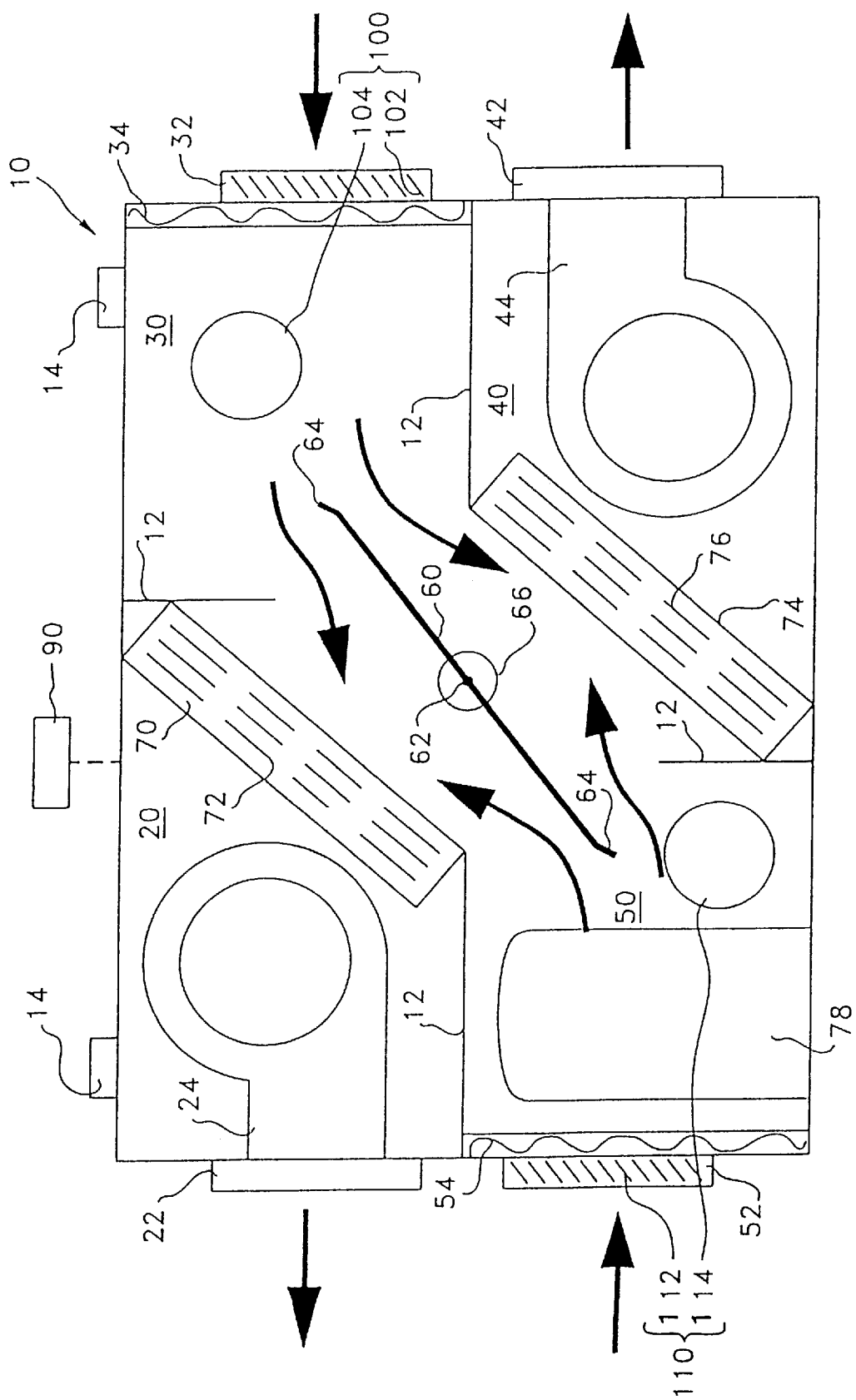
FIG. 3 is a view similar to FIG. 1, showing the unit with partial air exchange between inside and outside the conditioned space.

Referring to FIGS. 1 to 3, there is shown a combined air exchange and air conditioning unit (10) according to a preferred embodiment of the present invention. The unit (10) is used for conditioning air in a conditioned space, such as a building, a house or even a single room. The unit (10) can be installed at various locations outside or inside the conditioned space. It is particularly suitable for wall mounting with the use of appropriate connecting means (14). Typical outside locations are for example roofs or walls, and typical inside locations are basements, closets, laundry rooms or garages.

The unit (10) basically comprises a housing enclosing four chambers. The first chamber is an exhaust air chamber (20) having an air outlet (22) for connection with an air exhaust location outside the conditioned space. The connection is usually made by an air duct, but depending on where the unit (10) is located, the air outlet (22) may be already outside. An exhaust blower (24) is used for drawing air from inside the exhaust air chamber (20) through the air outlet (22). The exhaust blower (24) is preferably located inside the exhaust air chamber (20). Alternatively, one can provide the exhaust blower (24) downstream the air outlet (22) and, for example, at the end of a corresponding air duct.

The second chamber is a return air chamber (30) having an air intake (32) for connection with at least one air return location in the conditioning space. The number of return locations in a building or a house is mainly depending on the size of the conditioned space and the amount of air to be conditioned. The return air chamber (30) can be connected to the return location by means of an air duct or the air can be directly drawn from the surroundings of the unit (10) in case the unit (10) is located inside the conditioned space.

The third chamber is a supply air chamber (40) having an air outlet (42) for connection with at least one air supply location in the conditioned space. The supply air chamber (40) is where the conditioned air is sent to the conditioned space by a supply blower (44) drawing air from inside the supply air chamber (40) through the air outlet (42). There are usually more than one air supply locations in buildings and houses. Typically, the air supply locations are scattered so that the air is evenly distributed in the conditioned space in function of the needs. The supply air is distributed by registers (not shown) connected to the unit (10) by branch ducts (not shown). Alternatively, the supply air can be directly sent outside the surroundings of the unit (10) in case the unit (10) is located inside the conditioned space. The supply blower (44) is preferably located inside the supply air chamber (40), but one can provide the supply blower (44) upstream the air outlet (42) and, for example, at the end of a corresponding air duct.

The fourth chamber is a fresh air chamber (50) having an air intake (52) for connection with a fresh air location outside the conditioned space and remote from the air exhaust location. The purpose of the fresh air is to replace any air drawn out of the conditioned space and, in sequence or at the same time, provide or absorb heat in a first heat exchanger (70) that is part of a heat pump means described further in the text. The expression "remote from the air exhaust location" does not necessary mean a far location. It means that the fresh air location should not be significantly contaminated by exhaust air that would reduce the quality of the fresh air. It is believed that a person skilled in the art would know how to locate the air outlet (22) and the air intake (52), or the end of the corresponding air ducts, if any, to avoid substantial contamination of the fresh air. As for the term "fresh air", it is opposed to the term "exhaust air", not necessarily meaning cool or air from outdoors. The fresh air can be drawn from an indoor location outside the conditioned space. Like the air supply chamber (20), the connection of the fresh air chamber (50) with the fresh air location is usually made by an air duct, but depending on where the unit (10) is located, the air intake (52) may already be outside. The chambers of the unit (10) are separated from one another by inner walls (12). A damper means is used for regulating the air transfers between the chambers so that each chamber is communicating with at least another, thereby allowing the air to flow within the unit (10).

The damper means preferably comprises a revolving plate (60) movable around the central axis (62) by an actuating means, such as an electric motor and any other suitable actuating mechanism. The plate (60) has two edges (64) parallel to the central axis that are pressing against walls (12) separating the chambers at extreme positions. The plate (60) is movable within a position range defined between a first and a second extreme position. The chambers are connected in pairs independent from one another when the plate (60) is in the first or second extreme position. It is of course suitable that the junction of the edges (64) with the walls (12) be substantially air tight.

The first extreme position, as shown in FIG. 1, is defined as the position allowing a connection of the return air chamber (30) with the supply air chamber (40) and a connection of the fresh air chamber (50) with the exhaust air chamber (20). There is no air exchange between inside and outside of the conditioned space in that position. The second extreme position, as shown in FIG. 2, is defined as the position allowing a connection of the return air chamber (30) with the exhaust air chamber (20) and a connection of the fresh air chamber (50) with the supply air chamber (40). There is a full air exchange between the interior and the exterior of the conditioned space in that position.

There are many possible positions of the plate (60) within the position range defined by the extreme position. FIG. 3 shows an example of an intermediary position.

As aforesaid, the unit (10) features a heat pump. The heat pump is used for reversibly transferring heat between air to be drawn by the exhaust blower (24) and air to be drawn by the supply blower (44). There are provided a first heat exchanger (70) for exchanging heat with air to be drawn by the exhaust blower (24) and a second heat exchanger (74) provided for exchanging heat with air to be drawn by the supply blower (44). Preferably, the first heat exchanger (70) is obliquely disposed inside the exhaust air chamber (20) and the second heat exchanger (74) is obliquely disposed inside the supply air chamber (40). The oblique disposition is suitable for reducing the size of the combined unit (10).

Figure 4:
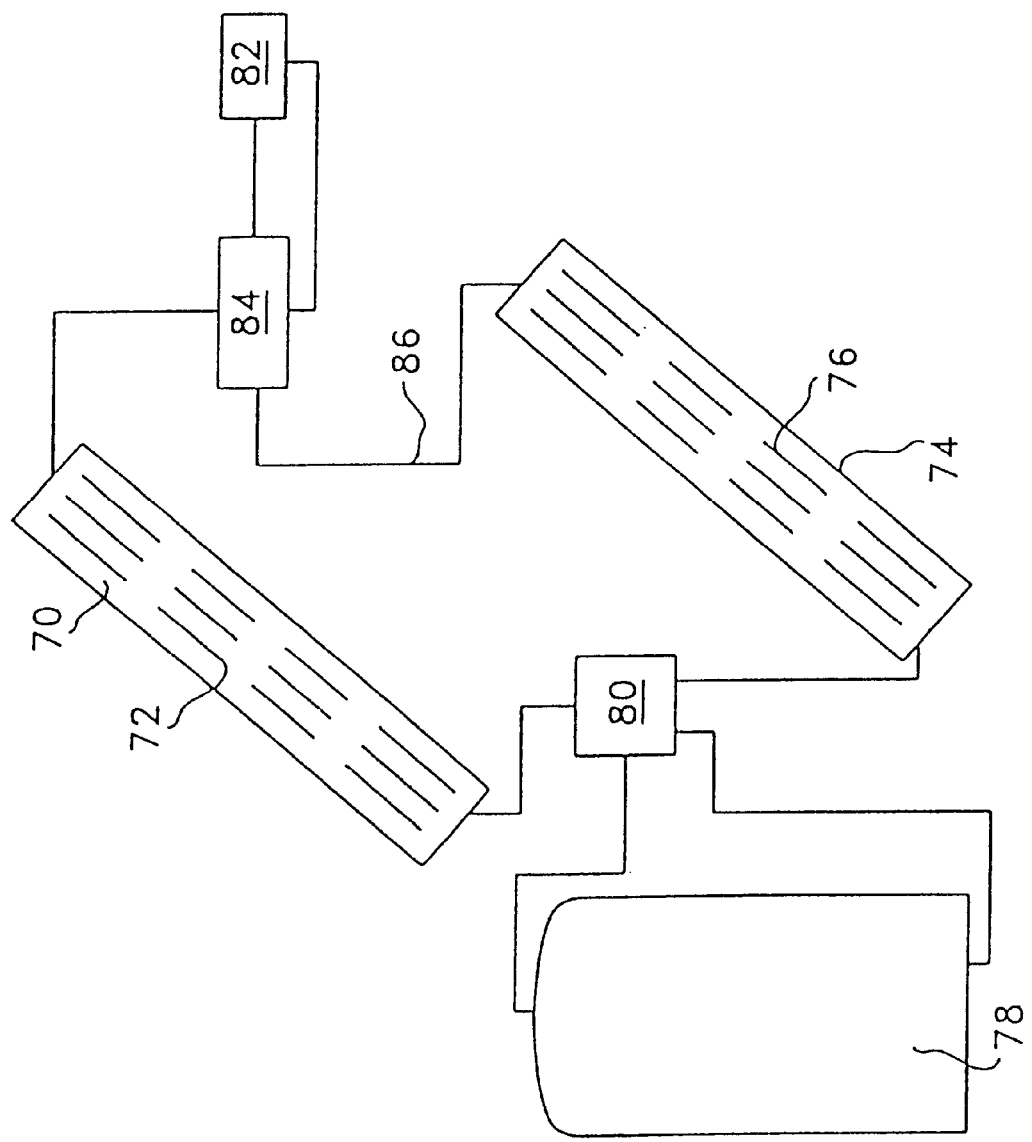
FIG. 4 is a simplified schematic view of the heat pump assembly according to a preferred embodiment of the present invention.

A refrigerant circuit is provided between the first and the second heat exchangers (70, 74). The first heat exchanger (70) comprises a first refrigerant coil (72) connected to other components of the heat pump as shown in FIG. 4. The second heat exchanger (74) comprises a second refrigerant coil (76). A compressor (78), preferably located inside the fresh air chamber (50), is used for compressing a compressible refrigerant. As apparent for a person skilled in the art, the compressor (78) is set between the exchangers (70, 74) and an expansion valve (82) is set on the other side, as shown in FIG. 4. The expansion valve (82) may be substituted for capillary tubes, for instance. The expansion valve (82) is used for lowering pressure of the refrigerant between the exchangers (70, 74). The components are connected together by a refrigerant tubing (86).

In use, the refrigerant is compressed by the compressor (78), which then increases its pressure and temperature for subsequently releasing heat in one of the exchangers (70, 74). The expansion valve (82) is used for lowering its pressure and the temperature for subsequently absorbing heat in the other exchangers (70, 74).

Since the heat pump is preferably reversible, a first valve (80) is provided for selectively directing the refrigerant compressed in the compressor (78) to either the first heat exchanger (70) or the second heat exchanger. Additionally, a second valve (84) synchronized with the first valve (80) may be provided if the expansion valve (82), or the like, is not reversible. The second valve (84) is then used for selectively directing the refrigerant from the first heat exchanger (70) through the expansion valve (82) and then to the second heat exchanger (74), or from the second heat exchanger (74) through the expansion valve (82) and then to the first heat exchanger (70). The second valve (84) is said to be synchronized with the first valve (80) to prevent that one of the exchangers (70,74) be isolated from the circuit. Of course, the first and the second valve (80,84) may be provided in a single device (not shown), such as a 4-way valve.

Control means (90) are used for controlling the actuating means (66) and the heat pump. There are many possible embodiments for the control means (90), ranging from the manual controls to the fully automated controls using a computer.

The combined unit (10) may work under many different modes. The first mode is the heating mode as used, for instance, during winter. In such mode, the first heat exchanger (70) is the evaporator, receiving the refrigerant from the expansion valve (82), and the second heat exchanger (74) is the condenser. When the plate (60) is positioned like in FIG. 1, the unit (10) acts as a regular heat pump that takes the heat in the outside air and transfers it to the air returning to the conditioned space. An additional heating element, such as an electric heating coil (not shown), may be added for heating the return air during very cold weather. During air exchange, like in FIGS. 2 and 3, the heat of the exhaust air coming from inside the conditioned space will be recovered and transferred back to the supply air, without reversing the cycle and thus allowing a better stability of the temperature of the return air.

In the cooling mode, the first heat exchanger (70) is the condenser and the second heat exchanger (74) is the evaporator. When the plate (60) is positioned like in, FIG. 1, the unit (10) acts as a regular air conditioning unit for cooling and dehumidifying the air returning to the conditioned space. Of course, means for collecting and evacuating water condensing on the evaporator are provided, as apparent to a person skilled in the art.

If the conditioned space needs to be cooled and fresh air is cooler than the air inside the conditioned space, the unit (10) may go to a mode called "free-cooling" where the compressor (78) is stopped and where there is a full air exchange, as in FIG. 2. Typically, the free-cooling occurs if the fresh air is below 72° F. (22° C.). The unit (10) may be used for controlling the humidity of the conditioned space under certain conditions. For example, in the cooling mode, the air is dehumidified by the second heat exchanger (74), then acting as the evaporator. In any mode, the amount of air exchanged between inside and outside of the conditioned spaced will have an impact on the humidity level whenever the characteristics of the outside and inside air is not the same.

One of the other possible modes is a neutral mode where there is no air exchange and where only the return air blower (44) is operated. This mode is used for instance after air exchange occurred during a given period of time.

Preferably, the control means (90) comprises an adjustable timer (not shown) for controlling the time and the frequency of the air exchange. It is also suitable to provide a manual control for overriding the signals from the timer or to select one of the operating modes, for instance:

heating only;

heating with air exchange;

cooling only;

cooling with air exchange;

air exchange only (with selection winter/summer); free-cooling;

ventilation only;

fully automated control.

Additionally, the unit (10) may be provided with a first air filter (34) set downstream the air intake (32) of the return air chamber (30) for filtering dust or the like. A second air filter (54) may also be set downstream the air intake (52) of the fresh air chamber (50) for filtering the fresh air.

According to a preferred embodiment, there may be provided a first air bypass assembly (100) connected to the return air chamber (30). The first air bypass assembly (100) may be controlled by the control means (90) or set manually. The first air bypass assembly (100) comprises a first air intake shutter (102) for partially closing the air intake (32) of the return air chamber (30), and a first air recovery means (104) proportionally providing bypass air inside the return air chamber (30). The first air recovery means (104) is for example an actuated damper connected to an air duct for drawing bypass air from a location inside the conditioned space and having distinctive characteristics. For instance, it may be suitable during summer to draw air from the basement of a house because it is much cooler than the other sections of the conditioned space. In winter, it may be suitable to draw air from warm locations such as a laundry room. The bypass air may even come from more than one source. As another example, the exhaust air from the bathroom may be used in winter when the unit (10) is in full air exchange, as in FIG. 2.

A second air bypass assembly (110) may also be connected to the fresh air chamber (50). The function of the second air bypass assembly (110) is very similar to the first air bypass assembly (100). The second air bypass assembly (110) may be controlled by the control means (90) or set manually. The second air bypass assembly (110) comprises a second air intake shutter (112) for partially closing the air intake (52) of the fresh air chamber (50). A second air recovery means (114) is proportionally providing bypass air inside the fresh air chamber (50). The, bypass air is coming from a location outside the conditioned space having distinctive characteristics. For instance, the air inside the attic, if not part of the conditioned space, may be warmer than the outdoor air and very suitable in the heating mode.

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention.

We claim:

1. A combined air exchange and air conditioning unit for conditioning air in a conditioned space, the unit comprising:
    an exhaust air chamber having an air outlet for connection with an air exhaust location outside the conditioned space;
    an exhaust blower means for drawing air from inside the exhaust air chamber through the air outlet, thereof;
    a return air chamber having an air intake for connection with at least one air return location in the conditioning space;
    a supply air chamber having an air outlet for connection with at least one air supply location in the conditioned space;
    a supply blower means for drawing air from inside the supply air chamber through the air outlet thereof;
    a fresh air chamber having an air intake for connection with a fresh air location outside the conditioned space and remote from the air exhaust location;
    a damper means for regulating air transfers between the chambers, the damper means being movable within a position range defined between a first and a second extreme position, the chambers being connected in pairs independent from one another when the damper means is in the first or second extreme position, the first extreme position allowing a connection of the return air chamber with the supply air chamber and a connection of the fresh air chamber with the exhaust air chamber, the second extreme position allowing a connection of the return air chamber with the exhaust air chamber and a connection of the fresh air chamber with the supply air chamber;
    an actuating means for moving the damper means within the position range;
    a heat pump means for reversibly transferring heat between air to be drawn by the exhaust blower means, and air to be drawn by the supply blower means, the heat pump means comprising:
        a first heat exchanger means for exchanging heat with air to be drawn by the exhaust blower means;
        a second heat exchanger means for exchanging heat with air to be drawn by the supply blower means;
        a control means for controlling the actuating means and the heat pump means.

2. A combined unit according to claim 1, wherein the damper comprises a revolving plate movable around a central axis thereof, the plate having edges parallel to the central axis that are pressing against walls, separating the chambers, at the extreme positions.

3. A combined unit according to claim 1, wherein the heat pump comprises a refrigerant circuit connected to the first and the second heat exchanger, the circuit comprising:
    a compressor to compress a compressible refrigerant;
    a first valve to selectively direct the refrigerant compressed in the compressor to the first heat exchanger or the second heat exchanger; and
    an expansion device to lower pressure of the refrigerant between the first and second heat exchanger.

4. A combined unit according to claim 3, wherein the heat pump further comprises a second valve synchronized with the first valve to selectively direct the refrigerant from the first heat exchanger through the expansion device and then to the second heat exchanger, or from the second heat exchanger through the expansion device and then to the first heat exchanger.

5. A combined unit according to claim 4, wherein the first and the second heat exchangers are respectively obliquely disposed inside the exhaust air chamber and the supply air chamber.

6. A combined unit according to claim 5, wherein the compressor is located inside the fresh air chamber.

7. A combined unit according to claim 1, further comprising a connector to mount the unit on a wall inside the conditioned space, the air outlets and the air intakes of the unit being connected to corresponding air ducts.

8. A combined unit according to claim 1, further comprising a first air filter set downstream the air intake of the return air chamber.

9. A combined unit according to claim 8, further comprising a second air filter set downstream the air intake of the fresh air chamber.

10. A combined unit according to claim 1, further comprising a first air bypass assembly connected to the return air chamber, the first air bypass assembly comprising a first air intake shutter to partially close the air intake of the return air chamber, and a first air recovery device to proportionally provide bypass air inside the return air chamber, the bypass air coming from a location inside the conditioned space having distinctive characteristics.

11. A combined unit according to claim 10, wherein the first air bypass assembly is controlled by the control means.

12. A combined unit according to claim 10, further comprising a second air bypass assembly connected to the fresh air chamber, the second air bypass assembly comprising a second air intake shutter to partially close the air intake of the fresh air chamber, and a second air recovery device to proportionally provide bypass air inside the fresh air chamber, the bypass air coming from a location outside the conditioned space having distinctive characteristics.

13. A combined unit according to claim 12, wherein the second air bypass assembly is controlled by the control means.

14. A combined air exchange and air conditioning unit for conditioning air in a conditioned space, the unit comprising:
    an exhaust air chamber having an air outlet for connection with an air exhaust location outside the conditioned space;
    an exhaust blower located inside the exhaust air chamber to draw air from inside the exhaust air chamber through the air outlet thereof;
    a return air chamber having an air intake for connection with at least one air return location in the conditioned space;
    a supply air chamber having an air outlet for connection with at least one air supply location in the conditioned space;
    a supply blower located inside the supply air chamber to draw air from inside the supply air chamber through the air outlet thereof;

a fresh air chamber having an air intake for connection with a fresh air location outside the conditioned space and remote from the air exhaust location;

a damper to regulate air transfers between the chambers, the damper being movable within a position range defined between a first and a second extreme position, the chambers being connected in pairs independent from one another when the damper is in the first or second extreme position, the first extreme position allowing a connection of the return air chamber with the supply air chamber and a connection of the fresh air chamber with the exhaust air chamber, the second extreme position allowing a connection of the return air chamber with the exhaust air chamber and a connection of the fresh air chamber with the supply air chamber, the damper comprising a revolving plate movable around a central axis thereof, the plate having edges parallel to the central axis that are pressing against walls separating the chambers at the extreme positions;

an actuator to move the damper within the position range;

a heat pump to reversibly transfer heat between air to be drawn by the exhaust blower and air to be drawn by the supply blower, the heat pump comprising:
- a first heat exchanger obliquely disposed inside the exhaust air chamber and upstream the exhaust blower to exchange heat with air to be drawn by the exhaust blower;
- a second heat exchanger obliquely disposed inside the supply air chamber and upstream the supply blower to exchange heat with air to be drawn by the supply blower;
- a refrigerant circuit connected to the first and the second heat exchanger, the circuit comprising:
  - a compressor located inside the fresh air chamber to compress a compressible refrigerant;
  - a first valve to selectively direct the refrigerant compressed in the compressor to the first heat exchanger or the second heat exchanger;
  - an expansion device to lower pressure of the refrigerant between the first and second heat exchanger;
  - a second valve synchronized with the first valve to selectively direct the refrigerant from the first heat exchanger through the expansion device and then to the second heat exchanger, or from the second heat exchanger through the expansion device and then to the first heat exchanger;
  - a control means for controlling the actuator and the heat pump.

15. A combined unit according to claim 14, further comprising a connector to mount the unit on the wall inside the conditioned space, the air outlets and the air intakes of the unit being connected to respective air ducts.

16. A combined unit according to claim 14, further comprising a first air filter set downstream the air intake of the return air chamber and a second air filter set downstream the air intake of the fresh air chamber.

17. A combined unit according to claim 14, further comprising a first air bypass assembly controlled by the control means and connected to the return air chamber, the first air bypass assembly comprising a first air intake shutter to partially close the air intake of the return air chamber, and a first air recovery device to proportionally provide bypass air inside the return air chamber, the bypass air coming from a location inside the conditioned space having distinctive characteristics.

18. A combined unit according to claim 17, further comprising a second air bypass assembly controlled by the control means and connected to the fresh air chamber, the second air bypass assembly comprising a second air intake shutter to partially close the air intake of the fresh air chamber, and a second air recovery device to proportionally provide bypass air inside the fresh air chamber, the bypass air coming from a location outside the conditioned space having distinctive characteristics.

* * * * *